US007016548B2

(12) United States Patent
Latva-Aho

(10) Patent No.: US 7,016,548 B2
(45) Date of Patent: Mar. 21, 2006

(54) MOBILE IMAGE TRANSMISSION AND RECEPTION FOR COMPRESSING AND DECOMPRESSING WITHOUT TRANSMITTING CODING AND QUANTIZATION TABLES AND COMPATIBILITY WITH JPEG

(75) Inventor: Antti Latva-Aho, Tampere (FI)

(73) Assignee: Nokia Mobil Phones Limited, Espoo (FI)

( * ) Notice: Subject to any disclaimer, the term of this patent is extended or adjusted under 35 U.S.C. 154(b) by 0 days.

(21) Appl. No.: 10/175,169

(22) Filed: Jun. 18, 2002

(65) Prior Publication Data

US 2002/0168111 A1 Nov. 14, 2002

Related U.S. Application Data

(63) Continuation of application No. 09/190,776, filed on Nov. 12, 1998, now abandoned.

(30) Foreign Application Priority Data

Nov. 14, 1997 (FI) ........................ 974244

(51) Int. Cl.
G06K 9/36 (2006.01)
(52) U.S. Cl. ...................... 382/251; 382/232
(58) Field of Classification Search ......... 382/232, 382/239, 233, 244–246, 248, 250, 251; 358/426.02, 358/426.03, 426.04; 375/240.02, 240.18, 375/240.2, 240.23, 240.24, 240.25, 240.26
See application file for complete search history.

(56) References Cited

U.S. PATENT DOCUMENTS

| 4,843,632 | A | 6/1989 | Lee et al. ................... 382/233 |
| 5,392,282 | A | 2/1995 | Kiema ........................ 370/491 |
| 5,440,404 | A | 8/1995 | Okamoto .................... 382/246 |
| 5,754,227 | A * | 5/1998 | Fukuoka .................. 348/231.6 |
| 5,847,847 | A | 12/1998 | Kosaka ....................... 358/539 |
| 6,181,823 | B1 * | 1/2001 | Takahashi ................... 382/232 |

FOREIGN PATENT DOCUMENTS

| EP | 0 469 835 A3 | 2/1992 |
| EP | 0 537 932 A3 | 4/1993 |
| EP | 0 659 023 A3 | 3/1996 |
| WO | WO 97/05748 | 2/1997 |

OTHER PUBLICATIONS

Finnish Official Action and English translation thereof.
"JPEG Still Image Data Compression Standard", Pennebaker et al., Van Nostrand Reinhold, New York, 1993, ISBN 0-442-01272-1, pp. 10-12.
"Digital Compression and Coding of Continuous-Tone Still Images—Part 1", ISO/IEC JTC 1/SC 29 N 257, 1992. pp. 341-353 & 371-379.

(Continued)

Primary Examiner—Yon J. Couso
(74) Attorney, Agent, or Firm—Perman & Green, LLP.

(57) ABSTRACT

The invention relates to a method in image processing, wherein an image in digital form is in coding phase compressed, quantized by a quantization matrix (QL, QC) and coded by a coding matrix (HL1, HK1, HL2), wherein one or more data frames are formed. In a decoding phase decoding, dequantization and decompression is carried out to the information comprised in the data frame. One or more matrices (QL, QC, HL1, HK1, HL2) used in the coding phase are left out of the data frame, wherein the corresponding matrix is stored into coding device (8) performing the decoding phase.

8 Claims, 10 Drawing Sheets

OTHER PUBLICATIONS

"Fundamentals of Digital Image Processing" Anil K. Jain, Prentice-Hall International Inc., New Jersey, 1989, ISBN 0-13-332578-4, pp. 476-483.

"European digital cellular telecommunication system (Phase 2); Technical realization of the Short Message Service (SMS) Point-to-Point (PP) (GSM 03.40)", ETSI, May 1996.

Pennebaker, W.B. et al. "JPEG Still Image Data Compression Standard", 1992, Van Nostrand Reinhold, New York, pp. 75, 99, 351-352, 344-345.

"Compression Gain Aspects of JPEG Image Compression," Chang, M. et al, 1992, pp. 159-168.

* cited by examiner

|    |    |    |    |    |     |     |     |
|----|----|----|----|----|-----|-----|-----|
| 16 | 11 | 10 | 16 | 24 | 40  | 51  | 61  |
| 12 | 12 | 14 | 19 | 26 | 58  | 60  | 55  |
| 14 | 13 | 16 | 24 | 40 | 57  | 69  | 56  |
| 14 | 17 | 22 | 29 | 51 | 87  | 80  | 62  |
| 18 | 22 | 37 | 56 | 68 | 109 | 103 | 77  |
| 24 | 35 | 55 | 64 | 81 | 104 | 113 | 92  |
| 49 | 64 | 78 | 87 | 103| 121 | 120 | 101 |
| 72 | 92 | 95 | 98 | 112| 100 | 103 | 99  |

|    |    |    |    |    |    |    |    |
|----|----|----|----|----|----|----|----|
| 17 | 18 | 24 | 47 | 99 | 99 | 99 | 99 |
| 18 | 21 | 26 | 66 | 99 | 99 | 99 | 99 |
| 24 | 26 | 56 | 99 | 99 | 99 | 99 | 99 |
| 27 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

| Category | Length of code | Code word |
|---|---|---|
| 0 | 2 | 00 |
| 1 | 3 | 010 |
| 2 | 3 | 011 |
| 3 | 3 | 100 |
| 4 | 3 | 101 |
| 5 | 3 | 110 |
| 6 | 4 | 1110 |
| 7 | 5 | 11110 |
| 8 | 6 | 111110 |
| 9 | 7 | 1111110 |
| 10 | 8 | 11111110 |
| 11 | 9 | 111111110 |

| Category | Length of code | Code word |
|---|---|---|
| 0 | 2 | 00 |
| 1 | 2 | 01 |
| 2 | 2 | 10 |
| 3 | 3 | 110 |
| 4 | 4 | 1110 |
| 5 | 5 | 11110 |
| 6 | 6 | 111110 |
| 7 | 7 | 1111110 |
| 8 | 8 | 11111110 |
| 9 | 9 | 111111110 |
| 10 | 10 | 1111111110 |
| 11 | 11 | 11111111110 |

| Index | Length of code | Code word | Index | Length of code | Code word |
|---|---|---|---|---|---|
| 0/0 | 4 | 1010 | 4/1 | 6 | 111011 |
| 0/1 | 2 | 00 | 4/2 | 10 | 1111111000 |
| 0/2 | 2 | 01 | 4/3 | 16 | 1111111110010110 |
| 0/3 | 3 | 100 | 4/4 | 16 | 1111111110010111 |
| 0/4 | 4 | 1011 | 4/5 | 16 | 1111111110011000 |
| 0/5 | 5 | 11010 | 4/6 | 16 | 1111111110011001 |
| 0/6 | 7 | 1111000 | 4/7 | 16 | 1111111110011010 |
| 0/7 | 8 | 11111000 | 4/8 | 16 | 1111111110011011 |
| 0/8 | 10 | 1111110110 | 4/9 | 16 | 1111111110011100 |
| 0/9 | 16 | 1111111110000010 | 4/A | 16 | 1111111110011101 |
| 0/A | 16 | 1111111110000011 | 5/1 | 7 | 1111010 |
| 1/1 | 4 | 1100 | 5/2 | 11 | 11111110111 |
| 1/2 | 5 | 11011 | 5/3 | 16 | 1111111110011110 |
| 1/3 | 7 | 1111001 | 5/4 | 16 | 1111111110011111 |
| 1/4 | 9 | 111110110 | 5/5 | 16 | 1111111110100000 |
| 1/5 | 11 | 11111110110 | 5/6 | 16 | 1111111110100001 |
| 1/6 | 16 | 1111111110000100 | 5/7 | 16 | 1111111110100010 |
| 1/7 | 16 | 1111111110000101 | 5/8 | 16 | 1111111110100011 |
| 1/8 | 16 | 1111111110000110 | 5/9 | 16 | 1111111110100100 |
| 1/9 | 16 | 1111111110000111 | 5/A | 16 | 1111111110100101 |
| 1/A | 16 | 1111111110001000 | 6/1 | 7 | 1111011 |
| 2/1 | 5 | 11100 | 6/2 | 12 | 111111110110 |
| 2/2 | 8 | 11111001 | 6/3 | 16 | 1111111110100110 |
| 2/3 | 10 | 1111110111 | 6/4 | 16 | 1111111110100111 |
| 2/4 | 12 | 111111110100 | 6/5 | 16 | 1111111110101000 |
| 2/5 | 16 | 1111111110001001 | 6/6 | 16 | 1111111110101001 |
| 2/6 | 16 | 1111111110001010 | 6/7 | 16 | 1111111110101010 |
| 2/7 | 16 | 1111111110001011 | 6/8 | 16 | 1111111110101011 |
| 2/8 | 16 | 1111111110001100 | 6/9 | 16 | 1111111110101100 |
| 2/9 | 16 | 1111111110001101 | 6/A | 16 | 1111111110101101 |
| 2/A | 16 | 1111111110001110 | 7/1 | 8 | 11111010 |
| 3/1 | 6 | 111010 | 7/2 | 12 | 111111110111 |
| 3/2 | 9 | 111110111 | 7/3 | 16 | 1111111110101110 |
| 3/3 | 12 | 111111110101 | 7/4 | 16 | 1111111110101111 |
| 3/4 | 16 | 1111111110001111 | 7/5 | 16 | 1111111110110000 |
| 3/5 | 16 | 1111111110010000 | 7/6 | 16 | 1111111110110001 |
| 3/6 | 16 | 1111111110010001 | 7/7 | 16 | 1111111110110010 ← HL2 |
| 3/7 | 16 | 1111111110010010 | 7/8 | 16 | 1111111110110011 |
| 3/8 | 16 | 1111111110010011 | 7/9 | 16 | 1111111110110100 |
| 3/9 | 16 | 1111111110010100 | 7/A | 16 | 1111111110110101 |
| 3/A | 16 | 1111111110010101 | | | |

| | Length of code | Code word |
|---|---|---|
| 8/1 | 9 | 111111000 |
| 8/2 | 15 | 111111111000000 |
| 8/3 | 16 | 1111111110110110 |
| 8/4 | 16 | 1111111110110111 |
| 8/5 | 16 | 1111111110111000 |
| 8/6 | 16 | 1111111110111001 |
| 8/7 | 16 | 1111111110111010 |
| 8/8 | 16 | 1111111110111011 |
| 8/9 | 16 | 1111111110111100 |
| 8/A | 16 | 1111111110111101 |
| 9/1 | 9 | 111111001 |
| 9/2 | 16 | 1111111110111110 |
| 9/3 | 16 | 1111111110111111 |
| 9/4 | 16 | 1111111111000000 |
| 9/5 | 16 | 1111111111000001 |
| 9/6 | 16 | 1111111111000010 |
| 9/7 | 16 | 1111111111000011 |
| 9/8 | 16 | 1111111111000100 |
| 9/9 | 16 | 1111111111000101 |
| 9/A | 16 | 1111111111000110 |
| A/1 | 9 | 111111010 |
| A/2 | 16 | 1111111111000111 |
| A/3 | 16 | 1111111111001000 |
| A/4 | 16 | 1111111111001001 |
| A/5 | 16 | 1111111111001010 |
| A/6 | 16 | 1111111111001011 |
| A/7 | 16 | 1111111111001100 |
| A/8 | 16 | 1111111111001101 |
| A/9 | 16 | 1111111111001110 |
| A/A | 16 | 1111111111001111 |
| B/1 | 10 | 1111111001 |
| B/2 | 16 | 1111111111010000 |
| B/3 | 16 | 1111111111010001 |
| B/4 | 16 | 1111111111010010 |
| B/5 | 16 | 1111111111010011 |
| B/6 | 16 | 1111111111010100 |
| B/7 | 16 | 1111111111010101 |
| B/8 | 16 | 1111111111010110 |
| B/9 | 16 | 1111111111010111 |
| B/A | 16 | 1111111111011000 |
| C/1 | 10 | 1111111010 |
| C/2 | 16 | 1111111111011001 |
| C/3 | 16 | 1111111111011010 |
| C/4 | 16 | 1111111111011011 |
| C/5 | 16 | 1111111111011100 |
| C/6 | 16 | 1111111111011101 |
| C/7 | 16 | 1111111111011110 |
| C/8 | 16 | 1111111111011111 |
| C/9 | 16 | 1111111111100000 |
| C/A | 16 | 1111111111100001 |
| D/1 | 11 | 11111111000 |
| D/2 | 16 | 1111111111100010 |
| D/3 | 16 | 1111111111100011 |
| D/4 | 16 | 1111111111100100 |
| D/5 | 16 | 1111111111100101 |
| D/6 | 16 | 1111111111100110 |
| D/7 | 16 | 1111111111100111 |
| D/8 | 16 | 1111111111101000 |
| D/9 | 16 | 1111111111101001 |
| D/A | 16 | 1111111111101010 |
| E/1 | 16 | 1111111111101011 |
| E/2 | 16 | 1111111111101100 |
| E/3 | 16 | 1111111111101101 |
| E/4 | 16 | 1111111111101110 |
| E/5 | 16 | 1111111111101111 |
| E/6 | 16 | 1111111111110000 |
| E/7 | 16 | 1111111111110001 |
| E/8 | 16 | 1111111111110010 |
| E/9 | 16 | 1111111111110011 |
| E/A | 16 | 1111111111110100 |
| F/0 (ZRL) | 11 | 11111111001 |
| F/1 | 16 | 1111111111110101 |
| F/2 | 16 | 1111111111110110 |
| F/3 | 16 | 1111111111110111 |
| F/4 | 16 | 1111111111111000 |
| F/5 | 16 | 1111111111111001 |
| F/6 | 16 | 1111111111111010 |
| F/7 | 16 | 1111111111111011 |
| F/8 | 16 | 1111111111111100 |
| F/9 | 16 | 1111111111111101 |
| F/A | 16 | 1111111111111110 |

Fig. 1e cont.

| Length of code (EOB) 2 | Code word |
|---|---|
| 0/0 | 00 |
| 0/1 | 01 |
| 0/2 | 100 |
| 0/3 | 1010 |
| 0/4 | 11000 |
| 0/5 | 11001 |
| 0/6 | 111000 |
| 0/7 | 111000 |
| 0/8 | 111110100 |
| 0/9 | 1111110110 |
| 0/A | 111111110100 |
| 1/1 | 1011 |
| 1/2 | 111001 |
| 1/3 | 11110110 |
| 1/4 | 111110101 |
| 1/5 | 1111111010 |
| 1/6 | 11111110110 |
| 1/7 | 1111111110001000 |
| 1/8 | 1111111110001001 |
| 1/9 | 1111111110001010 |
| 1/A | 1111111110001011 |
| 2/1 | 11010 |
| 2/2 | 11110111 |
| 2/3 | 1111110110 |
| 2/4 | 111111110110 |
| 2/5 | 1111111111000010 |
| 2/6 | 1111111110001100 |
| 2/7 | 1111111110001101 |
| 2/8 | 1111111110001110 |
| 2/9 | 1111111110001111 |
| 2/A | 1111111110010000 |
| 3/1 | 11011 |
| 3/2 | 11111000 |
| 3/3 | 1111111010 |
| 3/4 | 111111110111 |
| 3/5 | 1111111110010001 |
| 3/6 | 1111111110010010 |
| 3/7 | 1111111110010011 |
| 3/8 | 1111111110010100 |
| 3/9 | 1111111110010101 |
| 3/A | 1111111110010110 |

| | Code word |
|---|---|
| 4/1 | 111010 |
| 4/2 | 111110110 |
| 4/3 | 1111111110010111 |
| 4/4 | 1111111110011000 |
| 4/5 | 1111111110011001 |
| 4/6 | 1111111110011010 |
| 4/7 | 1111111110011011 |
| 4/8 | 1111111110011100 |
| 4/9 | 1111111110011101 |
| 4/A | 1111111110011110 |
| 5/1 | 111011 |
| 5/2 | 1111111001 |
| 5/3 | 1111111110011111 |
| 5/4 | 1111111110100000 |
| 5/5 | 1111111110100001 |
| 5/6 | 1111111110100010 |
| 5/7 | 1111111110100011 |
| 5/8 | 1111111110100100 |
| 5/9 | 1111111110100101 |
| 5/A | 1111111110100110 |
| 6/1 | 1111001 |
| 6/2 | 1111110111 |
| 6/3 | 1111111110100111 |
| 6/4 | 1111111110101000 |
| 6/5 | 1111111110101001 |
| 6/6 | 1111111110101010 |
| 6/7 | 1111111110101011 |
| 6/8 | 1111111110101100 |
| 6/9 | 1111111110101101 |
| 6/A | 1111111110101110 |
| 7/1 | 1111010 |
| 7/2 | 11111111000 |
| 7/3 | 1111111110101111 |
| 7/4 | 1111111110110000 |
| 7/5 | 1111111110110001 |
| 7/6 | 1111111110110010 |
| 7/7 | 1111111110110011 |
| 7/8 | 1111111110110100 |
| 7/9 | 1111111110110101 |
| 7/A | 1111111110110110 |

| | Length of code | Code word |
|---|---|---|
| 8/1 | 8 | 11111001 |
| 8/2 | 16 | 1111111110110111 |
| 8/3 | 16 | 1111111110111000 |
| 8/4 | 16 | 1111111110111001 |
| 8/5 | 16 | 1111111110111010 |
| 8/6 | 16 | 1111111110111011 |
| 8/7 | 16 | 1111111110111100 |
| 8/8 | 16 | 1111111110111101 |
| 8/9 | 16 | 1111111110111110 |
| 8/A | 16 | 1111111110111111 |
| 9/1 | 9 | 111110111 |
| 9/2 | 16 | 1111111111000000 |
| 9/3 | 16 | 1111111111000001 |
| 9/4 | 16 | 1111111111000010 |
| 9/5 | 16 | 1111111111000011 |
| 9/6 | 16 | 1111111111000100 |
| 9/7 | 16 | 1111111111000101 |
| 9/8 | 16 | 1111111111000110 |
| 9/9 | 16 | 1111111111000111 |
| 9/A | 16 | 1111111111001000 |
| A/1 | 9 | 111111000 |
| A/2 | 16 | 1111111111001001 |
| A/3 | 16 | 1111111111001010 |
| A/4 | 16 | 1111111111001011 |
| A/5 | 16 | 1111111111001100 |
| A/6 | 16 | 1111111111001101 |
| A/7 | 16 | 1111111111001110 |
| A/8 | 16 | 1111111111001111 |
| A/9 | 16 | 1111111111010000 |
| A/A | 16 | 1111111111010001 |
| B/1 | 9 | 111111001 |
| B/2 | 16 | 1111111111010010 |
| B/3 | 16 | 1111111111010011 |
| B/4 | 16 | 1111111111010100 |
| B/5 | 16 | 1111111111010101 |
| B/6 | 16 | 1111111111010110 |
| B/7 | 16 | 1111111111010111 |
| B/8 | 16 | 1111111111011000 |
| B/9 | 16 | 1111111111011001 |
| B/A | 16 | 1111111111011010 |
| C/1 | 9 | 111111010 |

| | | |
|---|---|---|
| C/2 | 16 | 1111111111011011 |
| C/3 | 16 | 1111111111011100 |
| C/4 | 16 | 1111111111011101 |
| C/5 | 16 | 1111111111011110 |
| C/6 | 16 | 1111111111011111 |
| C/7 | 16 | 1111111111100000 |
| C/8 | 16 | 1111111111100001 |
| C/9 | 16 | 1111111111100010 |
| C/A | 16 | 1111111111100011 |
| D/1 | 11 | 11111111001 |
| D/2 | 16 | 1111111111100100 |
| D/3 | 16 | 1111111111100101 |
| D/4 | 16 | 1111111111100110 |
| D/5 | 16 | 1111111111100111 |
| D/6 | 16 | 1111111111101000 |
| D/7 | 16 | 1111111111101001 |
| D/8 | 16 | 1111111111101010 |
| D/9 | 16 | 1111111111101011 |
| D/A | 16 | 1111111111101100 |
| E/1 | 14 | 11111111100000 |
| E/2 | 16 | 1111111111101101 |
| E/3 | 16 | 1111111111101110 |
| E/4 | 16 | 1111111111101111 |
| E/5 | 16 | 1111111111110000 |
| E/6 | 16 | 1111111111110001 |
| E/7 | 16 | 1111111111110010 |
| E/8 | 16 | 1111111111110011 |
| E/9 | 16 | 1111111111110100 |
| E/A | 16 | 1111111111110101 |
| F/0 (ZRL) | 10 | 1111111010 |
| F/1 | 15 | 111111111000011 |
| F/2 | 16 | 1111111111110110 |
| F/3 | 16 | 1111111111110111 |
| F/4 | 16 | 1111111111111000 |
| F/5 | 16 | 1111111111111001 |
| F/6 | 16 | 1111111111111010 |
| F/7 | 16 | 1111111111111011 |
| F/8 | 16 | 1111111111111100 |
| F/9 | 16 | 1111111111111101 |
| F/A | 16 | 1111111111111110 |

Fig. 1f cont.

MOBILE IMAGE TRANSMISSION AND RECEPTION FOR COMPRESSING AND DECOMPRESSING WITHOUT TRANSMITTING CODING AND QUANTIZATION TABLES AND COMPATIBILITY WITH JPEG

CROSS-REFERENCE TO RELATED APPLICATIONS

This application is a continuation of U.S. application Ser. No. 09/190,776, filed Nov. 12, 1998, now abandoned, the disclosure of which is incorporated herein by reference in its entirety.

BACKGROUND OF THE INVENTION

1. Field of the Invention

The present invention relates to image processing and a device.

2. Brief Description of Related Developments

In recent years, digital technology has developed intensely, so various methods have been developed to transmit and record various images in digital form. Advantages of digital technology include better reproduced, disturbance-free and enduring images; also deterioration of quality can be avoided in copying. In a digital recording device, also data of the contents of the recorded image can be included, which facilitates the retrieval of the desired image. However, the implementation of digital technology in image recording and transmission has been decelerated e.g. by the large quantity of data required by the digital presentation form.

The quantity of image information increases in relation to the resolution of image accuracy, i.e. as the accuracy is reduplicated the quantity of information is typically quadruplicated. The image information is composed of pixels, each of which is showing one detail of the image. This image information is formed e.g. of the luminance data of the pixel and in color images also of the color data of the pixel, as explained later in this specification.

The resolution of the image can be e.g. 256×256, i.e., the image is advantageously divided into 256 horizontal portions and 256 vertical portions. In case of a black and white image with 256 grey tone values the image information of each pixel can be illustrated as eight binary digits, i.e., by one byte. Thus, the quantity of image information without compression is 524 288 bits (=256×256×8 bits), i.e., 65 536 bytes.

An image according to VGA standard (Video Graphics Array) which is known as such e.g. in connection with computers, is composed of 640 horizontal pixels and 480 vertical pixels, e.g. the image resolution is 640×480. In an image in accordance with a more recent, XGA standard (Extended Graphics Array), the resolution can even exceed 1,000×1,000 pixels, wherein one digitized, uncompressed image comprises over a million bytes.

In many embodiments it is, however, not necessary to show such large pictures. E.g. a telephone book embodiment, where e.g. a graphic display of a mobile station can, in addition to the telephone number, display the picture of the person concerned, can be implemented by a relatively rough resolution and still the person is recognizable on the basis of the picture.

Numerous different methods have been developed for compressing image information in electric form (digitized). One known compression method is disclosed in the ISO standard DIS 10918-1 of the International Organisation for Standardization, i.e., in so-called JPEG standard (Joint Photographic Experts Group). The JPEG standard is designed for compression of color and grey tone images taken of naturalistic image objects. Compression according to the JPEG standard is most efficient in compression of photographs, naturalistic paintings, computer formed pictures which aim to look naturalistic, as well as other corresponding images.

Compression according to the JPEG standard is not necessarily loss-free, i.e., the compressed image can for some parts be different than the original image. These changes are usually such small changes which cannot be detected by the human eye. By using compression in accordance with JPEG standard, it is possible to obtain compression ratio of the value 10:1 to 20:1 without observable losses, i.e., the size of the compressed image is less than 10% of the original image size. If some minor, visually observable changes are tolerated in the image, even a compression ratio of 50:1 can be obtained.

The JPEG standard is illustrated in more detail e.g. in Reference 1: "JPEG Still Image Data Compression Standard" and in Reference 2: "Digital Compression and Coding of Continuous-tone Still Images—Part 1". A more detailed list of reference literature is found in the end of the present specification.

In order to apply the compression method in accordance with the JPEG standard, the image, or any other data signal treated in accordance with the method, has to be in digital form. A generally used color image signal is composed of luminance and chrominance data. When the image is converted into digital form, both the luminance and the chrominance data is converted separately, usually in an accuracy of 8 bits.

Color images can be formed e.g. in a manner that the information of each pixel is composed of luminance and chrominance information. Thus, the quantity of information increases to triple, in case the chrominance information is illustrated by a bit quantity corresponding to that of the luminance information. Due to the properties of the human eye, the chrominance information can, however, be illustrated by using a smaller accuracy than the luminance information, in a manner that the eye does not detect any deterioration in image quality. Typically, both components of the chrominance information are formed from a square comprising four pixels. Color images can also be illustrated by a so-called RGB image in which each pixel is illustrated by using three primary colors, i.e., red (R), green (G) and blue (B). Thus, the quantity of information is in one image triple compared to a grey tone image. In a color image the intensity of each color is usually divided into 256 portions in a RGB image, i.e., 24 bits (3 bytes) are required for showing one pixel.

Usually also RGB images are converted into luminance/chrominance form before the image is compressed. For this purpose, a widely used conversion formula has been developed, which is known as abbreviation CCIR60 and marked as YCbCr. This is a kind of three dimensional presentation form, in which the various components can be calculated from the R, G and B information in the following manner:

$$Y = 0.299R + 0.587G + 0.114B \quad (1a)$$

$$Cb = -0.168R - 0.3313G + 0.5B \quad (1b)$$

$$Cr = 0.5R - 0.4187G - 0.0813B \quad (1c)$$

The luminance component Y illustrates the grey tones of the image and it can be used when showing a black and white image and when showing a color image in black and white. There are two chrominance components: Cb and Cr, which include the color information of the image. However, a color image can also be compressed in RGB form, but in this case the same compression efficiency that is obtained when compressing an image in luminance/chrominance form cannot usually be obtained.

In various image compression techniques, a discrete cosine transform (DCT) is performed to an image signal that has been converted to digital form, before the image signal is transmitted to a data transfer medium or recorded into recording media. By the DCT conversion it is possible to calculate the frequency spectrum of the periodic signal, i.e., to shift from time domain to frequency domain. The word discrete denotes in this context to the fact that in the conversion separate pixels are treated instead of continuous variables. In the image signal, the successive pixels have typically a large mutual correlation. One property of the DCT conversion is that the facients generated as a result of the DCT conversion are practically taken uncorrelated, so that the DCT conversion performs efficiently the conversion of the image signal from time domain to frequency domain.

When a discrete cosine transform is used in compression of a single image, two-dimensional conversion is required. Instead of time, the variables are the latitude and altitude co-ordinates X and Y. Further, the frequency is not the quantity of sequences in a second, as normally, but it illustrates e.g. the conversion rate of the luminance in the direction of location co-ordinates X,Y. This is called spatial frequency.

An image comprising a large amount of micronic details shows large spatial frequencies. E.g. the parallel lines in the image correspond to the larger frequency the more densely they are located. Diagonal directed frequencies that are larger than a certain limit value can be quantized more in image processing without observably deteriorating the image quality.

In the JPEG compression, the DCT conversion is carried out in blocks in a manner that the block size is 8×8 pixels. The luminance level that is converted has the full resolution. Both chrominance signals are sub-sampled, e.g. an area of 16×16 pixels is subsampled to an area of 8×8 pixels. The differences in block sizes are by and large due to the fact that the eye does not detect changes in chrominance as easily as it detects changes in luminance, wherein an area of 2×2 pixels is coded with the same chrominance value. However, the invention is not restricted merely to the JPEG compression and said block sizes, but it can be adapted also in other corresponding compression methods and in blocks of various sizes.

For example when converting luminance values to the DCT level, the luminance values and horizontal and vertical spatial frequencies calculated thereof are brought from-the pixel block that is converted. Each frequency component is calculated of all the values of the block that is converted. Thus, the elements of the coefficient matrix that are obtained by discrete cosine transform do not correspond to single pixels of the block that is converted. In the coefficient matrix, the horizontal frequency components illustrate the horizontal changes in the block that is converted, and in a corresponding manner, the vertical frequency components illustrate the vertical changes in the block that is converted. The first element in the first row in the upper left corner of the matrix illustrates the zero frequency value of the image block that is converted, because it is comparable to the average of the pixels of the block that is converted.

Subsequent to the calculation of the coefficient matrix, i.e., after the DCT conversion, a quantization is performed to an element F(i,j) of a coefficient matrix F, i.e., the elements are divided into quantization levels of an appropriate size in a manner that the visual system of the human eye is taken into account. FIG. 1a shows an example of a luminance-signal quantization matrix QL used generally in image quantization, and FIG. 1b shows an example of a chrominance-signal quantization matrix QC used generally in image quantization. Quantization is performed advantageously in accordance with Formula (2a). In image dequantization, e.g. when receiving a compressed image from data transfer medium, in the inverse transformation (iDCT) that is performed, a similar quantization matrix QL, QC are used in accordance with Formula (2b). Based on the quantization matrices QL, QC and formulas (2a) and (2b), it can be detected that in connection with larger frequencies and in diagonal direction fewer quantization levels are used than in connection with frequencies close to zero. This is especially due to the fact that larger diagonal frequencies are less important to the human visual system than frequencies close to zero frequency and substantially horizontal and vertical frequencies.

$$QF(i, j) = \frac{F(i, j)}{Q(i, j)} \quad (2a)$$

$$Rec(i,j) = Q(i,j) \times QF(i,j) \quad (2b)$$

Subsequently, for a quantized, DCT converted matrix, a coding is performed, wherein at first the elements of each matrix are arranged sequentially, preferably in a manner that the first element is an matrix element (0,0). Next, the second element (0,1) in the first horizontal line of the matrix is selected. The next step is to move in diagonal direction down and to the left to the first element (1,0) of the second horizontal line. From here it is moved one line down to the first element (2,0) of the third horizontal line, and thereafter back in the diagonal direction, up and right to the first horizontal line, i.e., in the order (0,0), (0,2). Finally, the last element in the last horizontal line is placed, which in connection with the most usually used 8×8 block size is the eighth element of the eighth horizontal line (7,7). The aim of this arrangement is to take into account e.g. the fact that the images usually contain more information in smaller frequencies than in larger frequencies, wherein particularly the coefficients illustrating larger frequencies are zero in connection with many images. Thus, several sequential zero values are obtained which can be replaced by information showing the quantity of successive zero values. FIG. 1g further illustrates by means of a line drawn in the matrix the sequential arrangement of the matrix elements.

In order to code the quantized, DCT converted image, the JPEG standard illustrates two coding systems: Huffman coding and arithmetic coding. These methods transform the data that is converted into codes of varying length in a manner, that for often repeating symbols is formed a shorter code word than for less frequently repeating symbols. In addition, in Huffman coding, no code word appears in the initial part of another code word. When e.g. the code word that corresponds to a bit string (symbol) '0010 0001' is '10', then no other code word begins with the bits '10'.

FIG. 1c illustrates a Huffman Table H, which has proved to be efficient in image compression. Table of FIG. 1c is regarded for coding the DC difference value of a luminance signal. The compression efficiency of this table has been compared to optimal compression, performed by a table calculated from the image information by Huffman coding (Reference 3, a list of references is in the end of the specification). In the comparison, different images were used, a Huffman table being calculated for each image. The size of the compressed image was typically only less than 5 percent larger when using the table of FIG. 1c than when using the optimal table calculated from the image information. On the other hand, to calculate a compression table for each image separately increases the capacity required for the compression device, wherein in a large part of JPEG coded images a Huffman coding table of FIG. 1c have been used. The operation of Huffman coding is illustrated later in this specification when an apparatus according to the advantageous embodiment of invention is discussed.

Advantageously after the coding, a data frame is formed wherein e.g. the coded image information is located. FIG. 3a illustrates in reduced form a data frame 300 in accordance with the JPEG standard. The data frame 300 comprises header data 301 and data field 302, wherein the actual image information is located. The header data 301 contain e.g. the following fields: a start of image (SOI) 303 of the frame, a JPEG file interchange format header (JFIF) 304, one or more Huffman coding tables 305, and a quantization table 306, a start of frame (SOF0) 307, and a start of scan (SOS) 308 of the image. Next in the data frame is the image information, which is compressed advantageously by using DCT conversion and coded by Huffman coding. Subsequent to the image information there is still an end of image (EOI) field 309, which informs of the end of the data frame. It is known as such that also enciphering can be carried out to the data frame, if necessary, by using an encryption algorithm or an encryption key.

FIG. 3a illustrates also the length of each field as bytes. The length of the header data is in this example 424 bytes. The length of the image information depends e.g. on the resolution of the image and the coding and compression level used in the compression of the image. In connection with portable electric devices, such as mobile stations, the images are usually rather small, wherein the length of the header data forms a relatively large proportion of the entire data frame.

The need to process images will increase also in different portable devices, such as mobile stations. The drawback is then that images compressed in the present form in accordance with prior art require a large quantity of storage capacity. This restricts the quantity of images that are storable into a portable device at a time and, on the other hand, also the image transmission lasts relatively long.

At the time when the compressed image is wished to be converted into uncompressed form, e.g. for viewing, the image is Huffman decoded, dequantized and an inverse DCT conversion (iDCT) is carried out. To perform the decoding, it is necessary to know the contents of the coding table and, in a corresponding manner, to perform decompression, one has to know the contents of the table used in compression. In image compression systems of prior art these tables which are read in the header field in the inverse conversion of the image are added in the header of the data frame. However, this involves the drawback that the size of the tables can be tens, even hundreds of bytes, wherein the proportion of the tables of the header field can be even larger than the quantity of the actual image information.

SUMMARY OF THE INVENTION

An object of the present invention is to bring about a method and a system for image compression. The invention is based on the idea that the header of the image information frame is decreased in a manner that no compression and coding tables are stored therein. These tables are stored advantageously in decoders.

The invention provides considerable advantages over prior art methods, systems and devices. Compression carried out in accordance with the invention reduces the quantity of the information transmitted in image storage and transfer, wherein in the same storage space more images or images of an improved quality can be stored than is possible in prior art. Also, the transfer of images is faster because there is less information to be transferred per one image than when transferring images compressed according to prior art.

BRIEF DESCRIPTION OF THE DRAWINGS

In the following, the invention is described in more detail with reference made to the enclosed drawings, where FIG. 1a shows an advantageous quantization matrix of luminance signal in reduced form, FIG. 1b shows an advantageous quantization matrix of chrominance signal in reduced form, FIG. 1c shows an advantageous Huffman coding table for a DC coefficient of luminance signal in reduced form, FIG. 1d shows an advantageous Huffman coding table for a DC coefficient of chrominance signal in reduced form, FIG. 1e shows a part of an advantageous Huffman coding table for AC coefficients of luminance signal in reduced form, FIG. 1f shows a part of an advantageous Huffman coding table for AC coefficients of chrominance signal in reduced form.

DETAILED DESCRIPTION OF THE PREFERRED EMBODIMENTS

Figure 2:
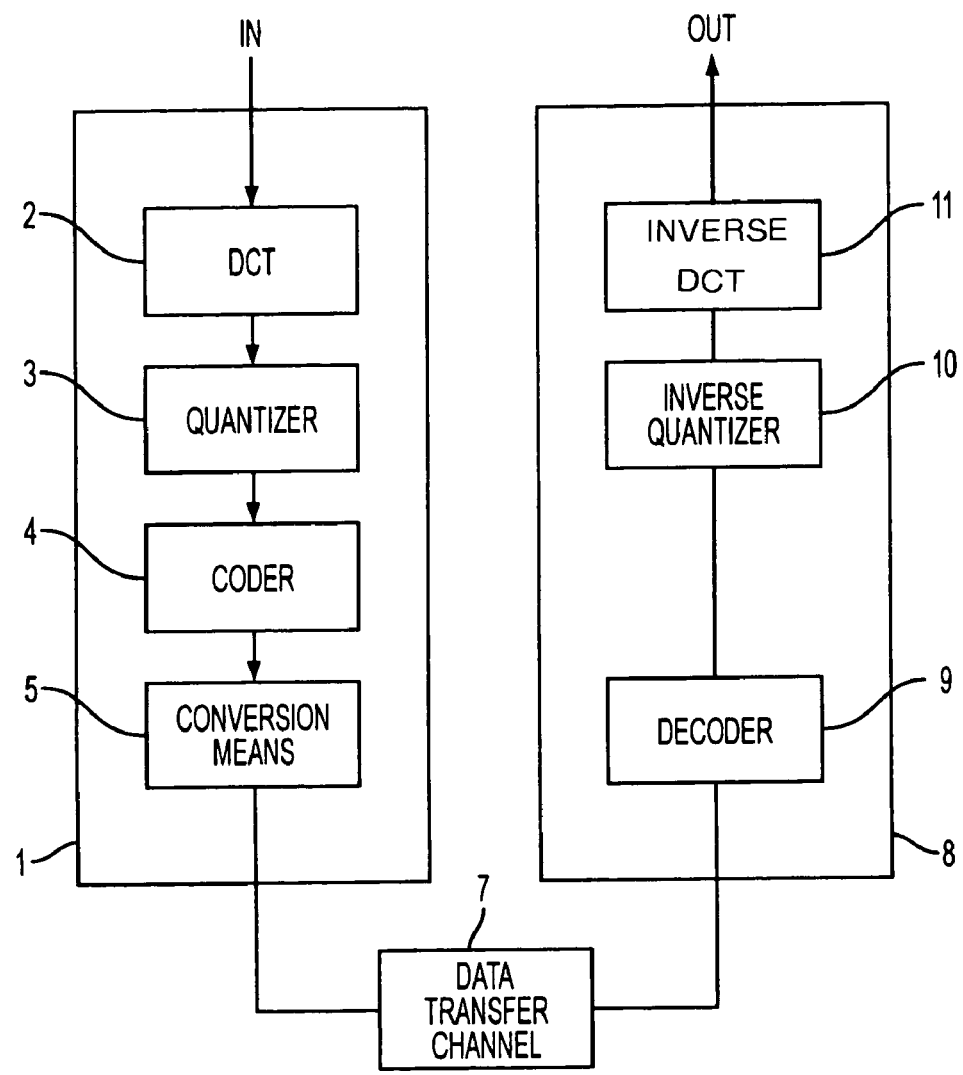
FIG. 2 shows an image coding and decoding device according to an advantageous embodiment of the invention in reduced block diagram.

FIG. 2 illustrates a coding device 1 according to an advantageous embodiment of the invention. Image information in digital form that is coded is directed to an input IN of the coding device 1. The image information is preferably divided into blocks in a manner that at a time a given part of the image area is coded, e.g. in JPEG coding, a block of 8×8 pixels. To the pixels of this block, a discrete cosine transform is carried out in a DCT converter 2. In black and white pictures the image information is the luminance signal illustrating the brightness level of the pixels, wherein the DCT converter 2 comprises one discrete cosine converter. In color-image coding the DCT converter 2 comprises advantageously one discrete cosine converter for the luminance signal and two discrete cosine converters for the chrominance signal. However, these different converters are not illustrated in figures as such, nor are the other blocks of the coder that are discussed later, these having separate means for luminance and chrominance signals. The DCT converter 2 forms a 8×8 coefficient matrix FL, FC of each 8×8 image block that is converted, wherein a first element FL(0,0), FC(0,0) of the first horizontal line illustrates the average DC level of the pixels in the block. Horizontally, the remaining elements FL(1,0) . . . FL(7,0) illustrate the horizontal frequencies of the block, i.e., the variations in the details of respective image blocks in horizontal direction, and vertically the elements FL(0,1) . . . FL(0,7) of the coefficient matrix illustrate the vertical frequencies of the block. E.g. dense striping is in discrete cosine transform seen as larger frequencies.

From the DCT converter 2 the results of the conversion are directed to a quantization means 3. By the quantization means 3 a sort of stressed scaling is performed for different frequencies. In the quantization, quantization matrices QL, QC are used, whose dimensions correspond to the dimensions of the coefficient matrices FL, FC obtained from discrete cosine transform. FIG. 1a shows a quantization matrix QL of the luminance signal, and FIG. 1b shows a quantization matrix QC of the chrominance signal. The quantization means 3 carries out a division for coefficient matrices FL, FC formed by the DCT converters by using advantageously the formula (2a) illustrated earlier in the present specification. E.g. for the elements of a coefficient matrix FL of the luminance signal, a calculation is carried out by using the formula (2a) in a manner that the matrix AC used in the formula is the coefficient matrix FL of the luminance signal and the quantization matrix used is a quantization matrix QL of the luminance signal. In a corresponding manner, in connection with color images, the quantization of the FC elements in the coefficient matrix of the chrominance signal components is performed according to the formula (2a) in a matter that in the formula the coefficient matrix FC of the chrominance signal is used as the matrix AC and the quantization matrix QC of the chrominance signal is used as the quantization matrix.

Figure 1G:
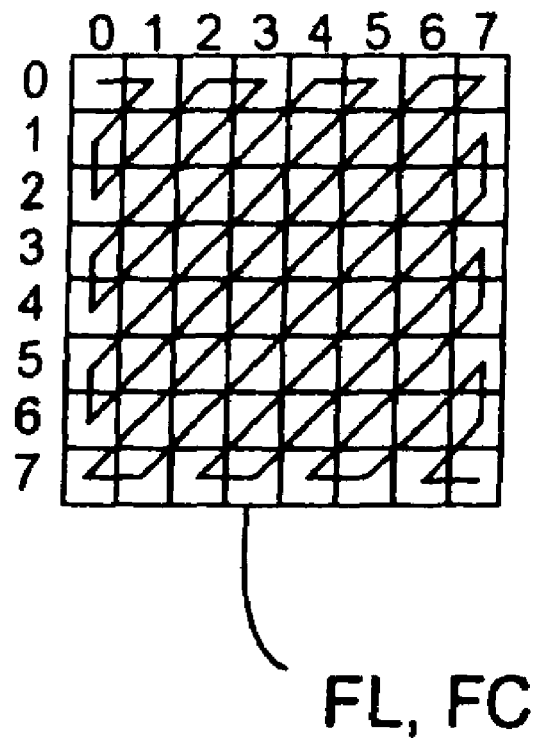
FIG. 1g shows an advantageous manner of arranging elements of image matrix in succession.

Subsequent to the quantization, the quantized signal is directed to a coder 4, where the elements of the quantized signal are coded advantageously in the order illustrated in FIG. 1g. The coding is carried out preferably by a code of a varying length, such as the Huffman code. In coding, advantageously coefficient tables are used, of which a generally used coding table HL1 for the DC coefficient of the luminance signal is illustrated in the accompanying FIG. 1c. FIG. 1d shows in a corresponding manner a coding table HK1 for the DC coefficient of the chrominance signal. FIG. 1e illustrates further, in an exemplifying manner, a part of a coding table HL2 for AC coefficients of the luminance signal, i.e., the elements (0,1)–(7,7), and FIG. 1g of a coding table HK2 for the AC coefficients of the chrominance signals.

In the tables of FIGS. 1c and 1d, the left column illustrates a category by which the values that are coded are divided into size ranges. The values between 0 and 255 can be divided e.g. into 12 substantially equal portions, wherein category 0 comprises advantageously values 0 to 20, category 1 values 21 to 41, etc. In the coding phase, it is first examined to which category the value that is coded belongs to and on the basis of this a corresponding code word is selected from the third column of the table. In the second column of the table, information of the length of the code is shown for each category. After the code word, the index of the value that is coded in this category is annexed. In values classified according to the afore-mentioned example the index can be illustrated by using five bits. The categories can be divided also in stressed form, e.g. a part of the value areas are divided into smaller areas than the remaining value areas. The value that is coded is typically a difference of DC coefficients of two successive blocks, but the value can also be the absolute DC coefficient of each block.

With AC coefficients of matrices formed of the luminance signal, typically a coding table according to FIG. 1e is used. The left hand figures of the markings in the left hand column of the table illustrate the quantity of successive zero-valued terms in the matrix before the following term that deviates from zero, and the right hand figure separated by a slash illustrates the quantity of meaningful bits in the next term. The second column of the table illustrates the length of the code word in bits, and the third column of the table shows the code words. The code word in the first line of the table is used when all the remaining terms of the matrix are zero.

Figure 3:
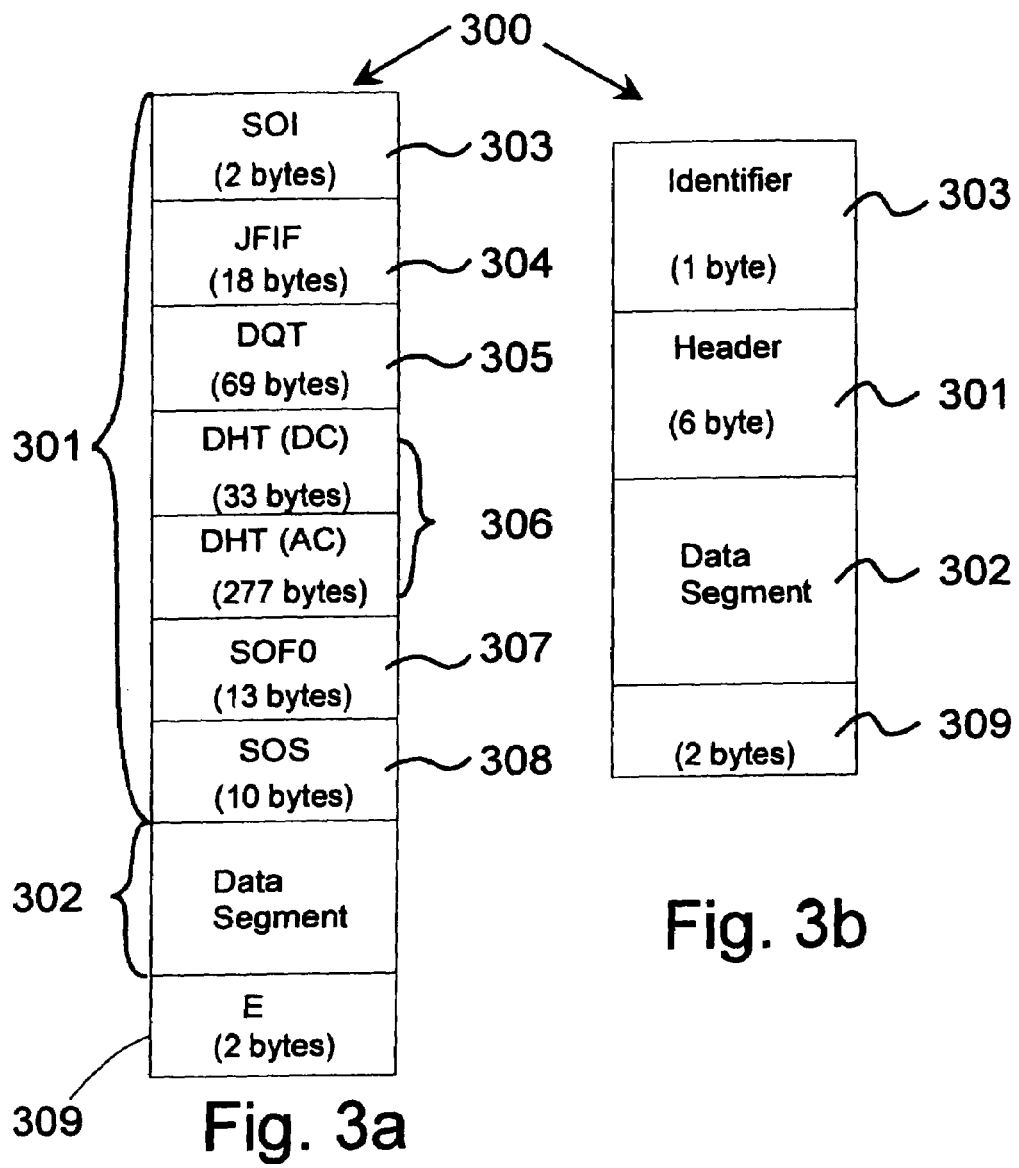
FIG. 3a shows a data frame according to prior art.
FIG. 3b shows the data frame of FIG. 3a compressed with the method of the invention.

Subsequent to the coder 4, the signal is further directed to a conversion means, which on the basis of the coded signal forms in the invention a data frame 300 comprising a header field 301 and a data field 302. After the image information, there is still an end field 309, which informs of the ending of the data frame. One compressed data frame 300 formed according to the method of the invention is shown in the appended FIG. 3b. The information comprised in the header field 301 is more concise compared to the prior art header field of the data frame. The header field 301 comprises only the information necessary for the recognition of the data frame in the image decoding phase. The data field 302 of the data frame comprises the compressed image data. For this part the data frame 300 corresponds to a prior art data frame.

Figure 4:
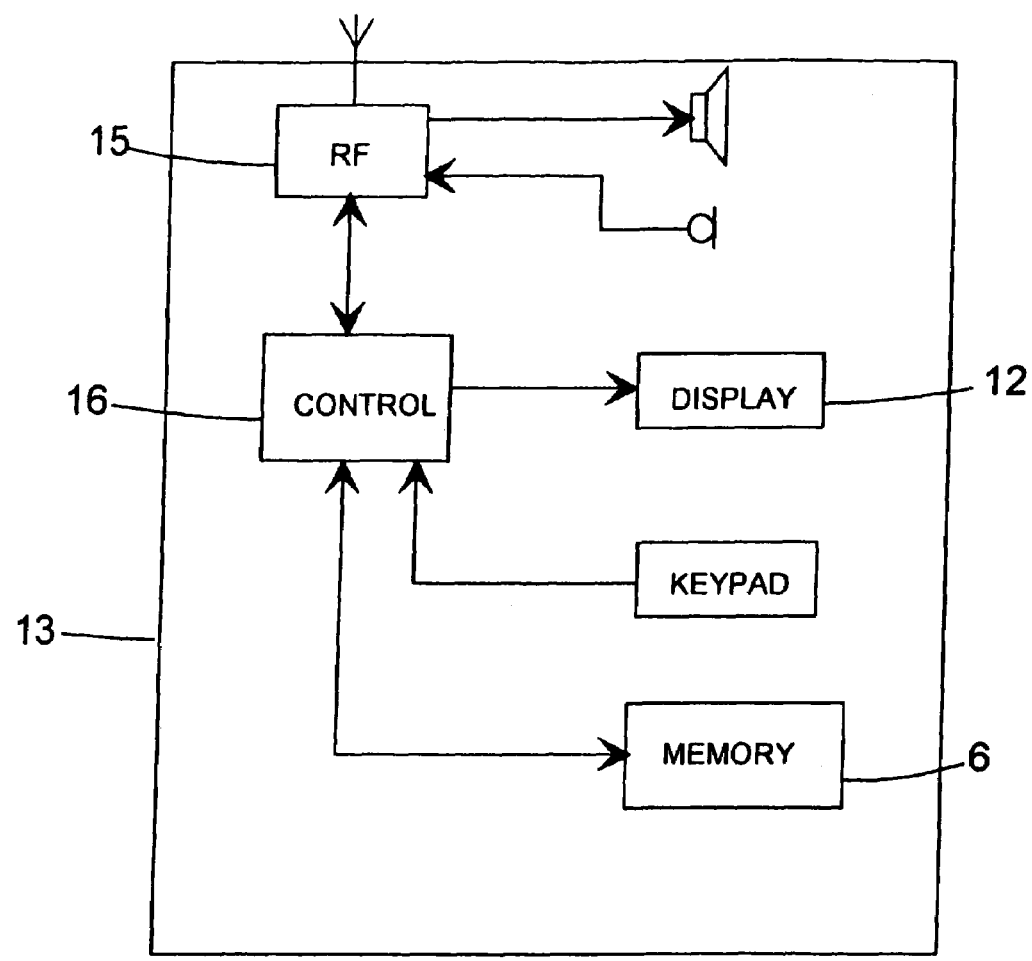
FIG. 4 shows a mobile station according to an advantageous embodiment of the invention in reduced block diagram.

Next, the data frame 300 can e.g. be stored into storage devices or memory 6 of FIG. 4, or the data frame can be transferred by a data transfer channel 7, such as a telecommunication network to be received and decoded.

In the following, decoding of image data is described in a decoding device 8 in accordance with FIG. 2. The decoding device 8 is formed e.g. in connection with a mobile station 13. The decoding device 8 comprises a decoder 9 wherein the type of the data frame is examined. In case the type corresponds to the type of the data frame compressed in accordance with the invention, the decoder 9 uses decoding tables stored into the decider 9 when decoding the code words formed in accordance with the compressed image in the data frame, these decoding tables having the same contents as the coding tables used in the coding of the coder 4. From the decoder 9, the decoded data is directed to an Inverse Quantizer 10, where the data is dequantized advantageously according to a formula (2). Subsequent to the dequantization, the data corresponds to the compressed image data, which is still to be decompressed in order to form an image corresponding to the original image. To perform this, the data is directed from the Inverse Quantizer 10 to a decompression means also referred to as inverse DCT 11, which can be a decompression means known as such. In connection with the present invention prior art compression methods, such as the JPEG can be used, which is earlier described in this specification.

From the inverse quantizer 10, the signal is inverse transformed by the inverse DCT 11 and then the image data can be directed e.g. to a display means 120 of FIG. 4 order to show the image to the user.

The method of the invention can be employed also for image transmission in a mobile communication network by using short messages (SMS, Short Message Service) known as such. In the GSM standard 03.40 (Reference 4) these short messages are described, as well as connecting them in order to transmit a larger amount of information (C-SMS, Concatenated Short Messages).

The invention can be adapted also in existing systems, e.g. in a manner that the JPEG coded or the like data frame is inputted into a conversion means or coder 4 such as that shown in FIG. 2, where the header field is modified e.g. by removing the tables and changing the type data. In a corresponding manner, in the decoding phase of the data the invention allows the converted data frame to be formed into a prior art data frame by changing the header field e.g. to correspond to that shown in FIG. 3a.

With the mobile station 13 it is possible to receive via mobile communication network (not shown) transferred, in accordance with the method of the invention compressed images. In the transfer of images, e.g. short messages (SMS, C-SMS) can be used, wherein a radio part 15 of the mobile station receives the short messages. In the application software of a control unit 16 of the mobile station, these short messages are discharged from the data frames 300 of the invention, for which decoding, dequantization and inverse discrete cosine transform is performed in the decoding means 8 implemented in a mobile station, which is described earlier in the present specification.

If needed, it is possible to form in the mobile station 13 also coding means 1, wherein images compressed in accordance with the invention can also be sent from the mobile station 13.

The invention can be adapted also in existing systems, e.g. in a manner that the JPEG coded or the like data frame is directed to conversion means 5, where the header field is modified e.g. by removing the tables and changing the type data. In a corresponding manner, in the decoding phase of the data the invention allows the converted data frame to be formed into a prior art data frame by changing the header field e.g. to correspond to that shown in FIG. 3a.

The invention can be adapted also in a manner that the coder and decoder comprises stored several coding tables or quantization tables or both. In this case, in the coding phase a coding table and a quantization table are selected e.g. on the basis of the image that is coded at the time. The tables are preferably indexed, wherein to the header field is added the index of the table used in coding and the index of the table used in quantization. The decoder examines these indices from the header field and on the basis of them selects the tables used in the decoding and dequantization. For other respects the invention operates substantially in a manner corresponding to what is described in connection with the first advantageous embodiment of the invention.

The data frame described in the present specification is only one example of a data frame, wherein the invention can be adapted, but the invention is not restricted to only this or corresponding JPEG type images and Huffman coding. It is advantageous to employ the present invention in images where variable length coding (VLC) or arithmetic coding has been used in image coding, or wherein the coding table or a part thereof is comprised in the data frame.

The image in digital form to which the invention can be adapted can also be e.g. an image formed in a computer by a drawing program.

REFERENCES

/1/ William B. Pennebaker, Joan L. Mitchell: "JPEG Still Image Data Compression Standard", Van Nostrand Reinhold, New York, U.S.A., 1993, ISBN 0-442-01272-1.

/2/ "Digital Compression and Coding of Continuous-tone Still Images—Part 1", ISO/IEC JTC 1/SC 29 N 257, 19.10.1992.

/3/ Anil K. Jain: "Fundamentals of Digital Image Processing", Prentice-Hall International Inc., New Jersey, U.S.A., 1989, ISBN 0-13-332578-4.

/4/ "European digital cellular telecommunication system (Phase 2); Technical realization of the Short Message Service (SMS) Point-to-Point (PP) (GSM 03.40)", European Telecommunication Standards Institute (ETSI), December 1995.

The invention claimed is:

1. A method of transmitting an image,
in which an image in digital form is compressed to form coefficient information,
quantized by a quantization matrix to form quantized coefficient information, and
encoded by a coding table to form encoded coefficient information,
wherein one or more data frames are formed comprising the encoded coefficient information,
wherein the quantization matrix and the coding table used in the coding of the data frame are omitted from the data frame,
wherein a dequantization matrix corresponding to the quantization matrix and a decoding table corresponding to the coding table used in compressing the image are stored in a receiving device,
wherein the data frame is received in the receiving device and
the data frame is changed into a data frame in accordance with a standard by including the quantization matrix and the coding table that are used for decoding the image data of the data frame.

2. The method according to claim 1, wherein the compression is carried out in accordance with JPEG standard compression.

3. The method according to claim 1, wherein the compression is carried out with discrete cosine transform.

4. A device comprising means for processing an image in digital form and means for showing the image to the user, which image in digital form has been compressed to form coefficient information, quantized by a quantization matrix to form quantized coefficient information and coded by a coding table to form encoded coefficient information and one or more data frames comprising the encoded coefficient information, wherein the quantization matrix and the coding table used in the coding of the data frame are omitted from the data frame, and which image processing means comprise means for decoding the encoded coefficient information to obtain decoded coefficient information, means for dequantization the decoded coefficient information to obtain reconstructed coefficient information, and means for decompressing the reconstructed coefficient information to obtain a reconstructed image, wherein the device further comprises means for storing a dequantization matrix corresponding to the quantization matrix and a decoding table corresponding to the coding table used in the image compressing, and means for inserting the dequantization matrix and the decoding table to the data frame before decoding the data frame in order to change the frame into a data frame in accordance with a standard.

5. The device according to claim 4, further comprising means for forming the data frame, wherein the means for forming the data frame comprises means for omitting the quantization matrix and the coding table used in the coding of the data frame from the data frame.

6. The device according to claim 4, wherein the image processing means comprise an inverse discrete cosine transformer.

7. A mobile station comprising:
means for processing an image in digital form; and
means for showing the image to the user, which image in digital form had been:
compressed to ton coefficient information,
quantized by a quantization matrix to form quantized coefficient information; and
coded by a coding table to form encoded coefficient information and one or more data frames comprising the encoded coefficient information,
wherein the quantization matrix and the coding table used in the coding of the data frame are omitted from the data frame, and
which image processing means comprise:
    means for decoding the encoded coefficient information to obtain decoded coefficient information,
    means for dequantizating the decoded coefficient information to obtain reconstructed coefficient information, and
    means for decompressing the reconstructed coefficient information to obtain a reconstructed image,
wherein the device further comprises:
means for storing a dequantization matrix corresponding to the quantization matrix and a decoding table corresponding to the coding table used in the image compressing, and
means for inserting the dequantization matrix and the decoding table to the data frame before decoding the data frame in order to change the frame into a data frame in accordance with a standard.

8. The mobile station according to claim 7 further comprising means for forming the data frame, wherein the means for forming the data frame comprises means for omitting the quantization table and the coding table used in the coding of the data frame from the data frame.

* * * * *